(No Model.)
W. ERRINGTON.
HYDRANT.
No. 462,478. Patented Nov. 3, 1891.
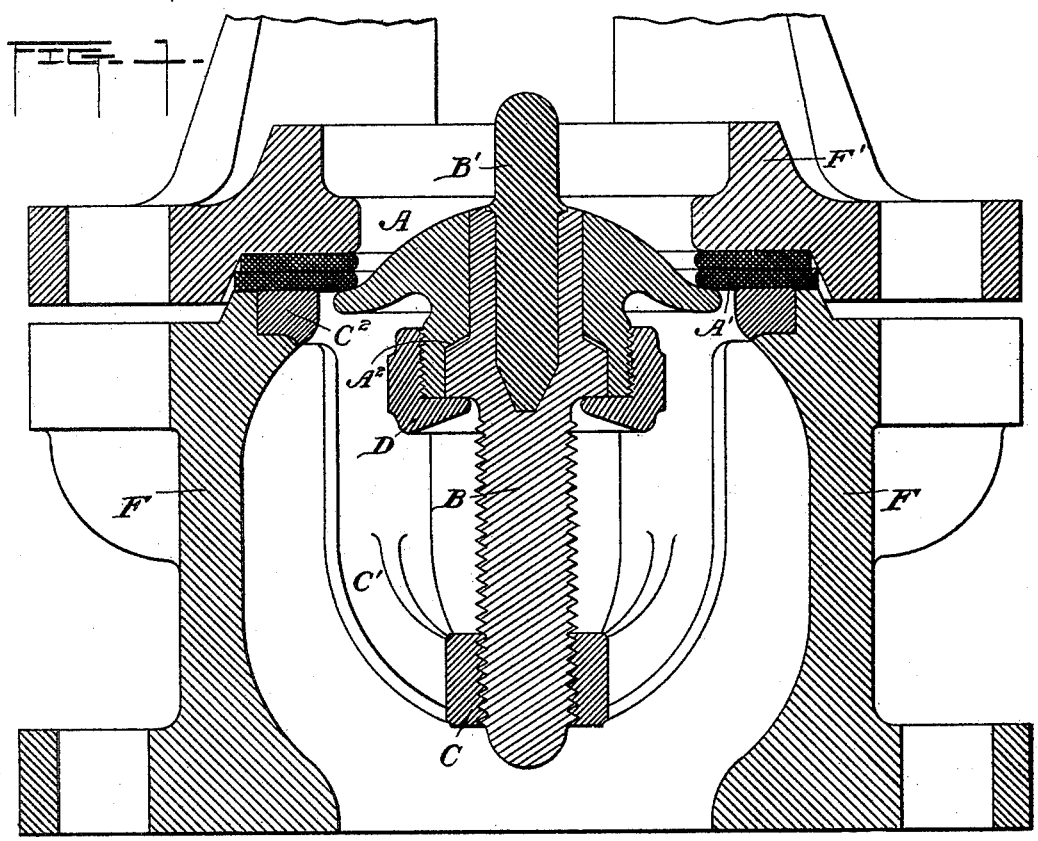
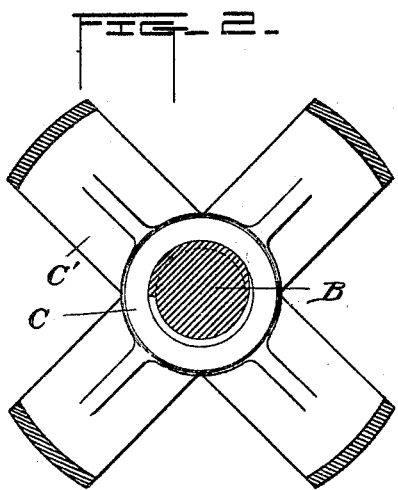
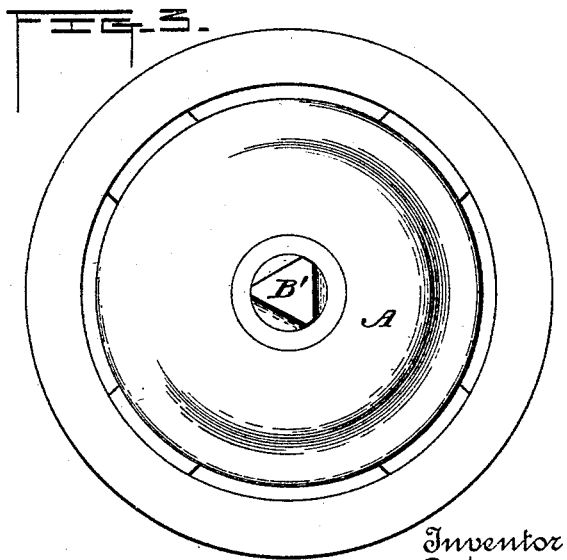
Witnesses
E. R. Conner
Geo. Snyder
Inventor
William Errington,
By Geo. H. Whiteau
Attorney
THE NORRIS PETERS CO., PHOTO-LITHO., WASHINGTON, D. C.

UNITED STATES PATENT OFFICE.

WILLIAM ERRINGTON, OF MELBOURNE, VICTORIA, ASSIGNOR TO EDWARD LEWIS, OF SAME PLACE.

HYDRANT.

SPECIFICATION forming part of Letters Patent No. 462,478, dated November 3, 1891.

Application filed May 22, 1891. Serial No. 393,713. (No model.)

*To all whom it may concern:*

Be it known that I, WILLIAM ERRINGTON, a subject of Her Majesty the Queen of Great Britain, residing at Salisbury buildings, Melbourne, in the county of Bourke and Colony of Victoria, have invented certain new and useful Improvements in Hydrant-Valves; and I do declare the following to be a full, clear, and exact description of the invention, such as will enable others skilled in the art to which it appertains to make and use the same, reference being had to the accompanying drawings, and to the letters of reference marked thereon, which form a part of this specification.

I employ mechanical means to effectively close the valves of hydrants or fire-plugs to insure that no offensive liquids—such as street-drainage or the like—can pass into the hydrant.

The mechanical means consist in a novel combination of a valve, a screw-spindle for same, and a supporting-nut and casing for the spindle and valve. The spindle has a projecting head or stem at its top, by which it can be screwed downward to open the valve or screwed upward to close it against its seat. From the foregoing it will be obvious that I do not depend on the pressure of liquids within the hydrant for closing the valve, and consequently it is quite immaterial what pressure is within, as if the valve be screwed up it is necessarily closed.

The attached drawings illustrate my invention within a hydrant.

Figure 1 is a vertical section. Fig. 2 is a sectional view on line 2 2, Fig. 1. Fig. 3 is a top plan view of the valve and cage.

A is the valve, B the spindle, and C the nut for lower screwed portion of spindle, the upper end of which has a steel pin or stem B' driven and held firmly in it, with the portion above the crown of valve made, preferably, of a triangular section, although it may be square or of any shape to suit the box-key at lower end of portable stand-pipe rod. Valve A is bored to neatly fit upon the upper part of valve-spindle, which has a tapered shoulder or valve-face at $A^2$, and the valve is held on the spindle by a coupling or nut D, the screw of which is a reverse hand to that on the valve-spindle. Nut C is formed at the center of arms or brackets C', descending from a ring $C^2$, that is fitted in a recess in hydrant-face, and the space between arms C' allows sufficient area or water-way for the volume of liquids that can pass from the hydrant when its valve is open. The parts C, C', and $C^2$ form a cage or casing within which the valve is supported.

A' is a valve-seat, preferably of leather; F, the hydrant, and F' its cover-flange.

What I claim, and desire to secure by Letters Patent of the United States, is—

1. The combination, with the casing supporting the nut C, of the threaded spindle B, engaging with said nut, the valve A, fitted to said spindle, and the coupling D for securing the valve, said coupling having a thread the reverse of that on the spindle, substantially as set forth.

2. The combination, with the casing supporting the fixed nut C, of the axially-movable threaded spindle B, having the shoulder $A^2$, the annular valve A, fitting around the upper part of the spindle and resting on said shoulder, and the coupling D, screwed upon the valve and abutting against the shoulder on the spindle, substantially as set forth.

3. The combination, with the threaded spindle B, having the prismatic pin B' fixed in its upper end, of the valve A, mounted on the spindle, the coupling D, clamping said valve in place, and the casing $C^2$ C', supporting the nut C, in which the spindle works, substantially as set forth.

In testimony whereof I affix my signature in presence of two witnesses.

WILLIAM ERRINGTON.

Witnesses:
 BEALINGTON BODYCOMB,
 HENRY HOILE.